United States Patent
Gudlin

(10) Patent No.: US 6,619,459 B2
(45) Date of Patent: Sep. 16, 2003

(54) CABLE DEVICE FOR ACTUATING A CONTROL ELEMENT

(75) Inventor: Tamas Gudlin, Braunschweig (DE)

(73) Assignee: Volkswagen AG, Wolfsburg (DE)

(*) Notice: Subject to any disclaimer, the term of this patent is extended or adjusted under 35 U.S.C. 154(b) by 0 days.

(21) Appl. No.: 10/195,284

(22) Filed: Jul. 15, 2002

(65) Prior Publication Data

US 2003/0019713 A1 Jan. 30, 2003

Related U.S. Application Data

(63) Continuation of application No. PCT/EP01/00148, filed on Jan. 8, 2001.

(30) Foreign Application Priority Data

Jan. 15, 2000 (DE) .......................... 100 01 446

(51) Int. Cl.⁷ ............................. B60T 7/10
(52) U.S. Cl. ..................... 192/219.4; 192/219.6; 188/2 D; 188/156; 74/500.5
(58) Field of Search .......... 192/219.4, 219.5, 192/219.6, 222; 188/2 D, 106 P, 156; 74/500.5, 501.6, 502.4, 502.6

(56) References Cited

U.S. PATENT DOCUMENTS

| | | |
|---|---|---|
| 2,966,244 A | 12/1960 | Schreyer |
| 3,116,815 A | 1/1964 | Chapman |
| 5,178,237 A * | 1/1993 | Ursel et al. .............. 188/106 P |
| 5,251,968 A | 10/1993 | Rath |
| 6,273,232 B1 * | 8/2001 | Kimura et al. .......... 192/219.6 |
| 6,279,692 B1 * | 8/2001 | Siepker et al. .............. 188/105 |
| 6,386,338 B1 * | 5/2002 | Powrozek ................... 188/156 |

FOREIGN PATENT DOCUMENTS

| | | |
|---|---|---|
| DE | 1 118 616 | 11/1961 |
| DE | 41 29 934 A1 | 3/1993 |
| DE | 43 17 257 C1 | 5/1994 |
| DE | 44 13 192 A1 | 10/1995 |
| DE | 197 42 573 A1 | 4/1999 |
| EP | 0 073 255 A1 | 3/1983 |
| EP | 0 397 008 A1 | 11/1990 |
| EP | 0 437 509 B1 | 7/1991 |
| WO | WO 97/44221 A1 * | 11/1997 |

* cited by examiner

Primary Examiner—Richard M. Lorence
(74) Attorney, Agent, or Firm—Laurence A. Greenberg; Werner H. Stemer; Manfred Beck

(57) ABSTRACT

A cable device for actuating a control element, in particular for actuating a transmission shift shaft of a motor vehicle transmission, and preferably for actuating a parking lock of the motor vehicle transmission, is provided. The cable device has a core and a sheath substantially encasing the core. The core and the sheath are mounted such that they form a pull-push cable. A first end of the core is operatively connected to the control element, in particular to the transmission shift shaft. A emergency actuation device cooperates functionally with the core in such a way that, in the event of a functional failure of a controlling device, the control element can be, preferably manually, actuated with the emergency actuation device.

16 Claims, 1 Drawing Sheet

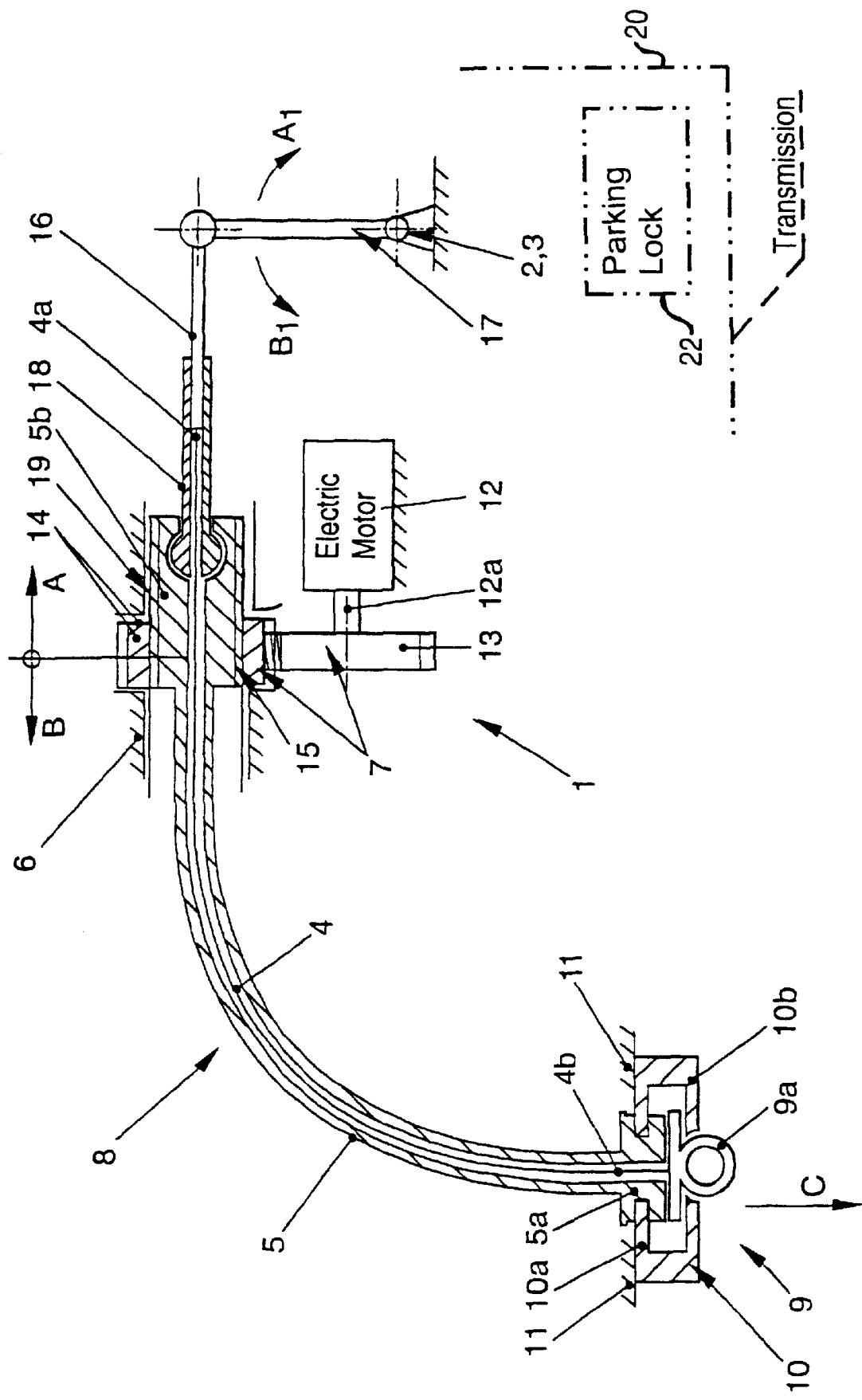

CABLE DEVICE FOR ACTUATING A CONTROL ELEMENT

CROSS-REFERENCE TO RELATED APPLICATION

This application is a continuation of copending International Application No. PCT/EP01/00148, filed Jan. 8, 2001, which designated the United States and was not published in English.

BACKGROUND OF THE INVENTION

FIELD OF THE INVENTION

The invention relates to a cable device for actuating a control element, in particular for actuating the shift shaft of a motor vehicle transmission.

European Patent No. EP 0 437 509 B1 discloses a cable device for operating a control element, to be precise for operating a parking brake of a vehicle. The cable device has a core and a sheath encasing the core. The core is configured, as a continuous wire, the two ends of the core being connected to the ends of the actuating levers of two parking brakes. At an abutment, a controlling device is provided, which is configured in such a way that at least a part of the sheath is moveable. The result is that the core and the sheath at least partly form a pull-push cable. When the parking brake or parking brakes of the motor vehicle is or are to be actuated, the movable part of the sheath is displaced by the controlling device, in such a way that the core exerts a pulling force, so that the actuating levers of the parking brakes are then accordingly actuated.

German Published, Non-Prosecuted Patent Application No. DE 197 42 573 A1 discloses a cable device, in which a manual transmission or an automatic transmission of a motor vehicle is actuated via a cable device. For this purpose, the core of the pull-push cable, which is formed from the core and from the sheath, is operatively connected to a manual shift lever. The sheath is arranged so as to be at least partly movable. An adjusting element is provided, with the aid of which a change in length of the sheath can be carried out, so that the cable device can be optimally adjusted.

The cable device disclosed in European Patent No. EP 0 437 509 B1 is not configured optimally. This conventional cable device is configured to be electrically actuable, and has an electric motor and corresponding nuts or a gearing. The resulting controlling device for moving the sheath functions in dependence of the electric current which is available during normal operating conditions. A problem arises when the electric power supply or an electronic system of the motor vehicle fails or the battery of the motor vehicle is no longer operational. In this case, the parking brakes, once set and locking the wheels of the motor vehicle, can no longer be easily released, since, when the controlling device is in a currentless state, the controlling device cannot easily be unlocked. Experience has shown that, particularly in winter months when the batteries of motor vehicles partially lose their operating capacity, the parking brakes of motor vehicles of this kind cannot always be released readily through the use of these conventional cable devices. Towing such a vehicle whose parking brake cannot be released is consequently either impossible or at least very difficult. In summary, an absolute operating reliability of the conventional cable device cannot be ensured in the event of a failure of the controlling device or in the event of a failure of the electric power supply of the motor vehicle.

SUMMARY OF THE INVENTION

It is accordingly an object of the invention to provide a cable device which overcomes the above-mentioned disadvantages of the heretofore-known cable devices of this general type and which has an increased operating reliability, in particular such that the control element to be actuated can at least be unlocked in the event of a failure of the controlling device on account of a lack of electric power.

With the foregoing and other objects in view there is provided, in accordance with the invention, a cable device, including:

- a core having a first end region and a second end region;
- a control element operatively connected to the first end region of the core;
- an abutment;
- a controlling device disposed at the abutment;
- a sheath substantially encasing the core, the sheath having a first region and a second region;
- the first region of the sheath being fixedly mounted, the second region of the sheath being movably mounted such that the sheath is at least partly movable by the controlling device and such that the core and the sheath form a pull-push cable; and
- an emergency actuation device operatively connected to the core and configured such that, in an event of a functional failure of the controlling device, the control element can be actuated, via the core, by the emergency actuation device.

In other words, the object of the invention is achieved by a cable device for actuating a control element, in particular for actuating the transmission shift shaft or selector shaft of a motor vehicle transmission, preferably the parking lock of the transmission that is engageable and disengageable with the aid of the cable device, with at least one core and with a sheath substantially encasing the core, a first end of the sheath being fastened, and the sheath, preferably the second end of the sheath, being mounted so as to be at least partly movable via a controlling device disposed in the region of an abutment, so that the core and the sheath form a pull-push cable, and a first end of the core being operatively connected to the control element, in particular the transmission shift shaft, wherein an emergency actuation device is provided, and the emergency actuation device is configured to cooperate functionally with the core in such a way that, in the event of a functional failure of the controlling device, the control element can be actuated with the aid of the core via the emergency actuation device.

Since, in addition to the controlling device, an emergency actuation device is provided, which can be actuated by hand operation, i.e. manually, in such a way that, in the event of a functional failure of the controlling device, the control element, in particular the shift shaft or the parking brake, can be actuated, the disadvantages described above are avoided. Even in the event of a failure or interruption of the electric power supply of the motor vehicle or a failure of the electronic system of the motor vehicle, the parking brake can be released or the parking brake engaged in the transmission can be disengaged via the cable device. The operating capacity or operating reliability of the cable device is thereby increased.

According to another feature of the invention, the emergency actuation device has a release element with a shackle operatively connected to the second end region of the core.

According to yet another feature of the invention, the emergency actuation device includes a release element operatively connected to the second end region of the core, wherein the release element is secured with the fastening element.

According to a further feature of the invention, the fastening element has first limbs and second limbs, the release element has an outer region, the first region of the sheath is an end region of the sheath, and the first limbs engage the end region of the sheath and the second limbs surround the outer region of the release element.

According to yet a further feature of the invention, the emergency actuation device is configured to be mounted on a vehicle console.

According to another feature of the invention, the controlling device includes an electric motor, a gearwheel stage and an actuating nut.

According to yet another feature of the invention, the actuating nut is disposed within the abutment, the sheath has a region with an external thread, and the actuating nut engages the external thread.

According to a further feature of the invention, the second region of the sheath is an end region of the sheath, and the controlling device is configured to displace the end region of the sheath.

According to yet a further feature of the invention, the control element is a transmission shift shaft, an actuating lever is operatively connected to the transmission shift shaft, and an actuating rod connects the first end region of the core operatively to the actuating lever.

According to another feature of the invention, the actuating rod is at least partly in engagement with a ball-mounted actuating arm.

According to yet another feature of the invention, the control element is a transmission shift shaft configured to be put in a plurality of selector stages including a parking lock stage, the controlling device includes an electric motor, and the electric motor is switched to be currentless in all selector stages except in the parking lock stage.

According to a further feature of the invention, the first region of the sheath is a first end region of the sheath and the second region of the sheath is a second end region of the sheath.

According to yet a further feature of the invention, the control element is a motor vehicle transmission shift shaft, and the controlling device actuates the motor vehicle transmission shift shaft.

According to yet another feature of the invention, the controlling device actuates the motor vehicle transmission shift shaft such that the controlling device selectively engages and disengages a parking lock.

According to yet a further feature of the invention, the second region of the sheath is an end region of the sheath, and the end region of the sheath is mounted at the abutment.

With the objects of the invention in view there is also provided, in combination with a vehicle transmission having a transmission shift shaft, a cable device which includes:
 a core having a first end region and a second-end region;
 the first end region of the core being operatively connected to the transmission shift shaft;
 an abutment;
 a controlling device disposed at the abutment;
 a sheath substantially encasing the core, the sheath having a first end region and a second end region;
 the first end region of the sheath being fixedly mounted, the second end region of the sheath being movably mounted such that the sheath is at least partly movable by the controlling device and such that the cable device forms a pull-push cable; and
 an emergency actuation device operatively connected to the core and configured such that, in an event of a functional failure of the controlling device, the transmission shift shaft can be actuated, via the core, by the emergency actuation device.

Other features which are considered as characteristic for the invention are set forth in the appended claims.

Although the invention is illustrated and described herein as embodied in a cable device for actuating a control element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE is a simplified diagrammatic sectional side view of the cable device according to the invention.

DESCRIPTION OF THE PREFERRED EMBODIMENTS

Referring now to the single FIGURE in detail, there is shown a cable device 1 for actuating a control element 2. The preferred embodiment of the cable device 1, which is illustrated here, serves for actuating the selector shaft or shift shaft 3 of a motor vehicle transmission 20. The motor vehicle transmission 20 is only indicated as a dash-dotted line. The parking lock 22 of the transmission 20 is engaged and disengaged with the aid of the cable device 1. The parking lock 22 is also only illustrated as a dash-dotted line. For this purpose, the cable device 1 has at least one core 4 and a sheath 5 essentially encasing the core 4. A first end 5a of the sheath 5 is fixedly mounted, and the sheath 5, to be precise the second end 5b of the sheath 5, is mounted so as to be at least partly moveable via a controlling device 7 arranged in the region of an abutment 6, so that the core 4 and the sheath 5 form a pull-push cable 8. Furthermore, a first end 4a of the core 4 is operatively connected to the control element 2, to be precise, here, the first end 4a of the core 4 is operatively connected to the shift shaft 3.

The disadvantages described above, are avoided by providing an emergency actuation device 9. The emergency actuation device 9 is configured such that and cooperates functionally with the core 4 in such a way that, in the event of a functional failure of the controlling device 7, the control element 2 can be actuated with the aid of the core 4 via the emergency actuation device 9. Even in the event of a loss or interruption of the electrical power of the motor vehicle or in the event of a failure of the battery or an electronic component, in the case illustrated here, the shift shaft 3 of the transmission 20 of the motor vehicle can be actuated appropriately with the aid of the cable device 1. More precisely, the shift shaft 3 can be actuated with the emergency actuation device 9, so that an engaged parking lock in a transmission, preferably in an automatic transmission, can also be disengaged again and the vehicle can be towed away. In other words, the functioning capacity or the reliability of the cable device 1 is increased in that, with the aid of the additional, preferably manual emergency actuation device 9, the control element 2, here the shift shaft 3 of the transmission, can be actuated, even when the controlling device 7, which is provided for a normal actuation, has failed. This will be explained in even more detail below.

The cable device 1 for actuating the shift shaft 3 of a motor vehicle transmission 20, can be seen in the single FIGURE. With the aid of the cable device 1, the parking lock 22 of the transmission 20 can be engaged or disengaged. For the event of a failure of the controlling device 7, as will be explained in more detail below, an emergency actuation device 9 is provided, which has a shackle-like release element 9a. The second end 4b of the core 4 is operatively connected to the release element 9a. It can be seen that the shackle-like release element 9a has a passage orifice for a human finger. The passage orifice is arranged on a bottom plate or on a base web which is operatively connected to the second end 4b of the core 4 which is preferably configured as a pulled wire. The release element 9a is secured with the aid of a fastening element 10. The fastening element 10 has first and second limbs 10a and 10b. The first limbs 10a are in engagement with the first end 5a of the sheath 5, the second limbs 10b surround the outer region of the bottom plate or baseplate of the release element 9a. The emergency actuation device 9 illustrated here is provided preferably on a console 11 in the interior of the vehicle, so that the driver can easily actuate the emergency actuation device 9 when the controlling device 7 fails.

It can be seen clearly here that the emergency actuation device 9 is arranged in the region of the console 11, to be precise the first end 5a of the sheath 5 has a peripheral groove, into which the first limbs 10a of the fastening element 10 engage, so that the first end 5a of the sheath 5 is likewise fixed in the region of the console 11. Furthermore, the fastening element 10 is configured in such a way that the release element 9a can be pulled out of the fastening element 10. For this purpose, the second limbs 10b of the fastening element 10 may be configured elastically, so that a corresponding movement of the release element 9a becomes possible. Here, however, the limbs 10b are releasably connected to the release element 9a, for example via corresponding screw connections, wherein the limbs 10b are demountable. Consequently, the limbs 10b are demounted before the release element 9a is actuated, and may be attached again later.

As the single FIGURE also clearly shows, the controlling device 7 has an electric motor 12 with a motor shaft 12a, a gearwheel stage 13 and an actuating nut 14. In the event of the corresponding actuation of the electric motor 12 or of the motor shaft 12a, the actuating nut 14 is activated or driven via the gearwheel stage 13. However, the actuating nut 14 is mounted or disposed within the abutment or support 6 which is provided at a given distance from the transmission, depending on the space requirement. The actuating nut 14 is in engagement with a region 15 of the sheath 5, the region having an external thread. With the aid of the controlling device 7 configured in this way, a displacement of the second end 5b of the sheath 5 and consequently a part of the sheath 5 itself becomes possible. In this case, a rotation-preventing device 19, for example an axial guide by use of a tongue and groove, is provided between the region 15 or the second end 5b of the sheath 5 and the abutment 6.

The single FIGURE shows that the first end 4a of the core 4 is operatively connected to the actuating lever 17 of the shift shaft 3 via an actuating rod 16. Thus, via the release element 9a, which is operatively connected to the second end 4b of the core 4, and via the core 4, the actuating rod 16 can be actuated or the actuating lever 17 pivoted in such a way that the shift shaft 3 is moved correspondingly, in order to engage or disengage the parking lock 22 in the transmission 20. In order to ensure a good guidance during a pivoting of the actuating lever 17 through the use of the actuating rod 16, the actuating rod 16 is at least partly in engagement with a ball-mounted actuating arm 18. The end of the actuating arm 18 has the shape of a spherical head and is mounted in an articulated manner on the second end 5a of the sheath 5.

When the cable device 1 is in operation, the electric motor 12 is switched to be currentless or is de-energized in all the driving stages of an automatic transmission, that is to say in reverse R, in neutral N, in forward drive D or in the driving stages 1, 2 or 3. Only when the parking lock P is to be selected in the transmission is current applied to the electric motor 12. In this case, the gearwheel stage 13 or the actuating nut 14 is then driven in such a way that the region 15 of the sheath 5 is displaced to the right according to the arrow A. The actuating lever 17 is thereupon likewise pivoted to the right according to the arrow $A_1$, the shift shaft 3 experiences the corresponding rotational movement and the parking lock P is engaged in the transmission. In this case, therefore, the core 4 or the sheath 5 is subjected to "push." In the opposite case, therefore, when the parking lock is to be disengaged again, in normal operation the gearwheel stage 13 and the actuating nut 14 are activated via the electric motor 12 in such a way that the region 15 of the sheath 5 is displaced to the left according to the arrow B. The actuating lever 17 is thereupon pivoted to the left according to the arrow $B_1$, the core 4 or the sheath 5 being subjected to "pull."

In the event of an emergency release, that is to say the disengagement of the parking lock P in the transmission, when the controlling device 7 fails or the electric system of the motor vehicle fails, the parking lock P can be disengaged via the release element 9a. To be precise, when the driver pulls on the release element 9a, the core 4 is subjected to pull and the actuating lever 17 is pivoted to the left according to the arrow $B_1$. In this case, the second limbs 10b of the fastening element 10 can then be bent outward, if these are configured elastically, in order to allow a movement of the release element 9a in the direction of arrow C. Here, however, the limbs 10b, which are not configured as integral parts of the fastening element 10, are demounted.

Preferably, the cable device 1 illustrated here is used for actuating a parking lock of automatic transmissions in motor vehicles. It is also conceivable that this cable device 1 is used for a brake actuation in the case of parking brakes. It is also conceivable that the release element 9a is not operated by hand, but is arranged or configured in such a way that it can also be actuated by the driver's foot.

The actuating nut 14 is supported within the abutment 6 and is in engagement with the external thread of the region 15 of the sheath 5. The region 15 of the sheath 5 is guided essentially axially here. A rotation-preventing device 19 is preferably provided here. At least an end of the sheath 5 is axially fixed in both directions, in the exemplary embodiment shown in the FIGURE the first end 5a of the sheath 5 is fixed with respect to the axial direction.

In a normal operation, a current is supplied to the electric motor 12 in order to engage the parking lock P. The electric motor 12 drives the actuating nut 14, so that the actuating lever 17 is rotated (according to the arrow $A_1$) into a position for engaging the parking lock P. The displacement of the sheath 5 results in a push or pull load on the core 4, with the result that the actuating lever 17 is rotated correspondingly.

If the vehicle were parked, with the parking lock P engaged, and if there were no current (e.g. when the battery is empty), an emergency release via the emergency actuation device 9 or via the release element 9a would be possible, so that, after the disengagement of the parking lock P, the vehicle could be towed away.

It is also conceivable that, for engaging the parking lock in the transmission, the cable device 1 functions in exactly the opposite way to that illustrated in the FIGURE. In other words, the core 4 is subjected to a pull load when the parking lock P is selected and to a push load when the parking lock P is deselected. In this case, in the event of an emergency actuation or emergency release, the core 4 then would not have to be pulled out, but, instead, pushed in, which could take place preferably by foot actuation from the driver's seat.

For example, the actuating nut 14 could also be arranged as an adjusting unit in another region of the sheath 5 or correspondingly between the first and the second end 5a or 5b of the sheath 5. In the latter case, the sheath 5 could then be made in two parts.

The thread of the region 15, that is in engagement with the actuating nut 14, is preferably configured as a self-locking thread. In particular, in the case of a controlling device 7 or an adjusting unit with a sheath 5 made of two parts, the actuating nut 14 could be provided with a right-left thread, that is to say the controlling device 7 has two components that can be pushed apart from one another.

Various types of transmission devices or devices for providing a gear ratio, for example spur gears, worm gears, bevel-wheel gears, chain mechanisms or else belt mechanisms, may serve for actuating the actuating nut 14.

As the FIGURE shows, the release element 9a is locked by the fastening element 10, to be precise, the release element 9a is locked in a mechanical way. It is also conceivable that the locking takes place electrically or that a mechanical and/or electrical configuration for locking the release element 9a via a corresponding fastening element 10 is provided. For example, in the case of an electrical locking of the emergency actuation device, this emergency actuation device 9 could be locked when the ignition is switched on and be unlocked when the ignition is switched off.

The FIGURE shows that the cable device 1, in particular the core 4, is linked to the control element 2, namely the shift shaft 3, via an actuating rod 16 and an actuating lever 17. However, other types of linking the cable device 1 and the control element 2 are also possible, in particular it is possible to have a direct link without levers.

I claim:

1. A cable device, comprising:
    a cable core having a first end region and a second end region;
    a control element operatively connected to said first end region of said cable core;
    an abutment;
    a controlling device disposed at said abutment;
    a cable sheath substantially encasing said cable core, said cable sheath having a first region and a second region;
    said first region of said cable sheath being fixedly mounted, said second region of said cable sheath being movably mounted such that said cable sheath is at least partly movable by said controling device and such that said cable core and said cable sheath form a pull-push cable; and
    an emergency actuation device operatively connected to said cable core and configured such that, in an event of a functional failure of said controlling device, said control element can be actuated, via said cable core, by said emergency actuation device.

2. The cable device according to claim 1, wherein said emergency actuation device has a release element with a shackle operatively connected to said second end region of said cable core.

3. The cable device according to claim 1, including:
    a fastening element; and
    said emergency actuation device including a release element operatively connected to said second end region of said cable core, said release element being secured with said fastening element.

4. The cable device according to claim 3, wherein:
    said fastening element has first limbs and second limbs;
    said release element has an outer region; and
    said first region of said cable sheath is an end region of said cable sheath, said first limbs engage said end region of said cable sheath and said second limbs surround said outer region of said release element.

5. The cable device according to claim 1, wherein said emergency actuation device is configured to be mounted on a vehicle console.

6. The cable device according to claim 1, wherein said controlling device includes an electric motor, a gearwheel stage and an actuating nut.

7. The cable device according to claim 6, wherein:
    said actuating nut is disposed within said abutment;
    said cable sheath has a region with an external thread; and
    said actuating nut engages said external thread.

8. The cable device according to claim 1, wherein:
    said second region of said cable sheath is an end region of said cable sheath; and
    said controlling device is configured to displace said end region of said cable sheath.

9. The cable device according to claim 1, wherein:
    said control element is a transmission shift shaft;
    an actuating lever is operatively connected to said transmission shift shaft; and
    an actuating rod connects said first end region of said cable core operatively to said actuating lever.

10. The device according to claim 9, including:
    a ball-mounted actuating arm; and
    said actuating rod being at least partly in engagement with said ball-mounted actuating arm.

11. The cable device according to claim 1, wherein:
    said control element is a transmission shift shaft configured to be put in a plurality of selector stages including a parking lock stage; and
    said controlling device includes an electric motor, said electric motor is switched to be currentless in all of the selector stages except in the parking lock stage.

12. The cable device according to claim 1, wherein said first region of said cable sheath is a first end region of said cable sheath and said second region of said cable sheath is a second end region of said cable sheath.

13. The cable device according to claim 1, wherein:
    said control element is a motor vehicle transmission shift shaft; and
    said controlling device actuates said motor vehicle transmission shift shaft.

14. The cable device according to claim 13, wherein said controlling device actuates said motor vehicle transmission shift shaft such that said controlling device selectively engages and disengages a parking lock.

15. The cable device according to claim 1, wherein said second region of said cable sheath is an end region of said cable sheath, and said end region of said cable sheath is mounted at said abutment.

16. In combination with a vehicle transmission having a transmission shift shaft, a cable device, comprising:
   a cable core having a first end region and a second end region;
   said first end region of said cable core being operatively connected to the transmission shift shaft;
   an abutment;
   a controlling device disposed at said abutment;
   a cable sheath substantially encasing said cable core, said cable sheath having a first end region and a second end region;
   said first end region of said cable sheath being fixedly mounted, said second end region of said cable sheath being movably mounted such that said cable sheath is at least partly movable by said controlling device and such that the cable device forms a pull-push cable; and
   an emergency actuation device operatively connected to said cable core and configured such that, in an event of a functional failure of said controlling device, the transmission shift shaft can be actuated, via said cable core, by said emergency actuation device.

* * * * *